United States Patent [19]
Ziegler et al.

[11] Patent Number: 4,640,240
[45] Date of Patent: Feb. 3, 1987

[54] ARRANGEMENT FOR LIMITING RADIAL THERMAL EXPANSIONS OF CYLINDERS OF A RECIPROCATING PISTON INTERNAL COMBUSTION ENGINE

[75] Inventors: Gerhard Ziegler, Besigheim; Karl Gregotsch, Heimerdingen; Rolf von Sivers, Rutesheim, all of Fed. Rep. of Germany

[73] Assignee: Dr. Ing.H.c.f. Porsche Aktiengesellschaft, Fed. Rep. of Germany

[21] Appl. No.: 655,733

[22] Filed: Sep. 28, 1984

[30] Foreign Application Priority Data

Sep. 30, 1983 [DE] Fed. Rep. of Germany ....... 3335536

[51] Int. Cl.⁴ .............................................. F02F 1/02
[52] U.S. Cl. .................................. 123/193 C; 123/668
[58] Field of Search ........... 123/41.84, 193 R, 193 C, 123/195 S, 668, 669; 92/169.2, 169.4

[56] References Cited

U.S. PATENT DOCUMENTS

| 3,315,573 | 4/1967 | DeCastelet | 123/193 C |
| 3,882,842 | 5/1975 | Bailey et al. | 123/41.84 |
| 4,391,238 | 7/1983 | Greier et al. | 123/193 C |
| 4,466,399 | 8/1984 | Hinz et al. | 123/668 |
| 4,524,732 | 6/1985 | Dworak et al. | 123/669 |

FOREIGN PATENT DOCUMENTS 147036 6/1952 Australia ............................ 123/669

Primary Examiner—Craig R. Feinberg
Attorney, Agent, or Firm—Barnes & Thornburg

[57] ABSTRACT

An arrangement for limiting radial thermal expansions of cylinders in a reciprocating piston internal combustion engine by way of control elements, each of which includes a ring-shaped clamping member, which are provided within the areas of maximum alternating abutment pulses of the piston at the cylinder and consist of a material with a smaller thermal expansion coefficient than the cylinder.

29 Claims, 5 Drawing Figures

ARRANGEMENT FOR LIMITING RADIAL THERMAL EXPANSIONS OF CYLINDERS OF A RECIPROCATING PISTON INTERNAL COMBUSTION ENGINE

The present invention relates to an arrangement for limiting radial thermal expansions of cylinders of a reciprocating piston internal combustion engine.

It has been found with internal combustion engines that noise formations stem essentially from piston noises. These noises are produced as a result of secondary movements of the piston which are strongly dependent on the running clearance between the cylinder and the piston skirt. It is known with cylinders from grey cast iron and with pistons of light metal, to provide the pistons for reducing the piston noises with one or several cast-in steel plates which are intended to lead to an adaptation of the thermal expansion of the piston to the cylinder. The diameters are thereby frequently so designed constructively that at the operating temperature a theoretical overlap occurs, i.e., the maximum piston diameter is minimally larger at the operating temperature than the cylinder inner diameter, which has a positive result on the noise development. In engines with light metal cylinders, the running clearance is far-reachingly independent of the temperature because the piston and cylinder have approximately the same thermal expansion.

It is the object of the present invention to achieve the effect of the minimum running clearance, respectively, of the minimum overlap, described with grey cast engines, also with light metal engines.

The underlying problems are solved according to the present invention in that the control element includes a ring-shaped clamping member which is provided within the area of the maximum alternating abutment pulses of the piston at the cylinder and consists of a material with smaller thermal expansion coefficient than the cylinder.

The piston displaceably supported in the cylinder of an internal combustion engine is loaded principally by periodically alternating gas forces on the piston bottom and by mass inertia forces. These forces cause movements (secondary movements) which are superimposed to the oscillating (primary) piston movement. As a result thereof, the piston carries out translatory movements from sidewall to sidewall or rotary movements within the running clearance. The running clearance is thereby significantly increased by elastic deformation as a result of the occurring forces. A more or less large pulse occurs during the impact depending on the participating mass and impact velocity which leads to body sound excitation of the engine structure. The impact velocity is the larger, the larger the travel distance for the acceleration, i.e., the greater the running clearance.

In order to attain a smaller running clearance of the piston within the cylinder liner, control elements are provided which form a local running clearance limitation for the necessary areas, such as, for example, for the areas in the upper and lower dead-center. According to experience, the alternating abutment noises of pistons occur in the piston positions within the area of the upper and lower dead-center. The control elements are correspondingly positioned thereat. As a result thereof, possibly present disadvantages of a general running clearance reduction, for example, increased friction, are limited to an acceptable extent.

The action of the control elements is based on a different thermal expansion of the cylinder liner (light metal) and of the clamping members (for example, steel). With cold engines, for example, during the cold start, the cylinder liner possesses a cylindrical shape with the heretofore customary running clearances. With increasing engine temperature up to the operating temperature, the expansion of the cylinder liner is limited within the critical areas of the upper and lower dead-center by the control elements constructed as clamping members so that local constrictions (in the $\mu$-meter range) form thereat. The clamping members can be constructively so designed that taking into consideration the elastic properties of the clamping members and of the cylinder liner as well as of the operating temperatures, the running clearance assumes a minimum value within the critical areas.

Any additional advantage from an engine acoustical point of view further resides in the fact that the mechanical input impedance is intentionally increased at the location of the pulse introduction by the additional reinforcement and mass application in order that the body sound introduction is reduced.

The clamping member may be constructed in an advantageous manner with a defined clamping action, that is, it may have a different width over the circumference. As a result thereof, a desired clamping increase and thus a running clearance reduction matched to these conditions is achieved in the oscillating plane of the connecting rod—conditioned on the higher abutment forces of the piston in the cylinder prevailing thereat than in a cross plane extending thereto.

The use of clamping members in the manner of steel bands which are constructed rectangularly shaped in cross section and/or matched conically to the cast-inclined removal surface of the cylinder enable a simple assembly without change in the piston or in the cylinder.

As a result of the construction of engines in the shape according to the present invention, the friction work which is dependent on the piston running clearance can be intentionally influenced. The exclusively local piston running clearance reduction affects an increased friction work only within this area. Thus, in the extreme case, two constructional modifications are possible such as the acoustic design and the friction work design.

With the acoustic design, the heretofore geometric dimensions of piston and cylinder are obtained. Local constrictions by the clamping members within the areas A and B go up to the theoretical overlap.

With the friction work designed, the cylinder diameter is increased, respectively, the piston diameter is decreased (friction work reduction). The running clearance is reduced by the clamping members within the area of the abutment changes (for example, areas A and B) to an acoustically acceptable extent, for example, to presently customary values.

These and further objects, features, and advantages of the present invention will become more apparent from the following description when taken in connection with the accompanying drawing which shows, for purposes of illustration only, several embodiments in accordance with the present invention, and wherein.

Figure 3:
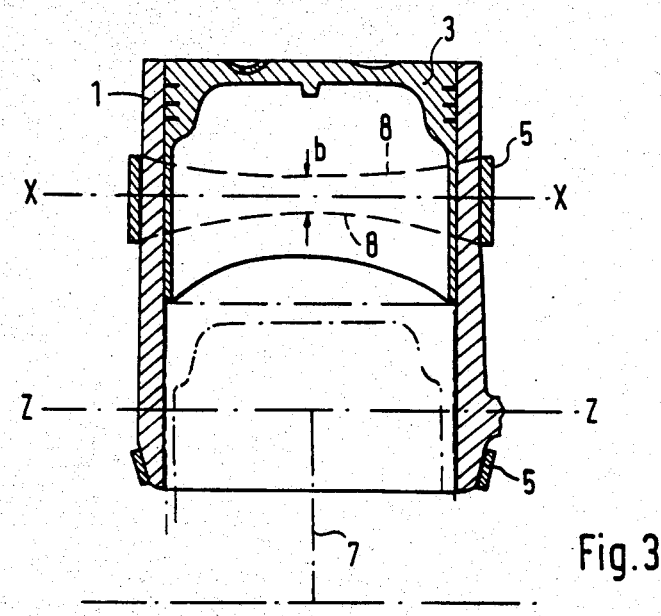
Figure 4:
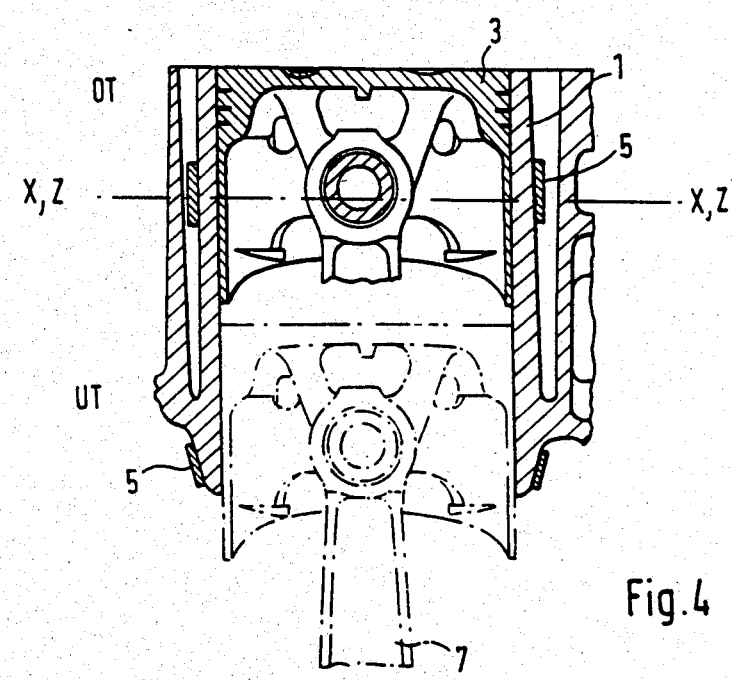

FIG. 3 is schematic view of the cylinder with a clamping member of different width in accordance with the present invention, as viewed in the oscillating plane of the connecting rod; and FIG. 4 is a schematic cross-sectional view of the cylinder with the positions of the piston within the alternating abutment area, approximately in the lower and top dead-center position, with coinciding horizontal planes of the clamping member and of the maximum piston diameter.

Figure 5:
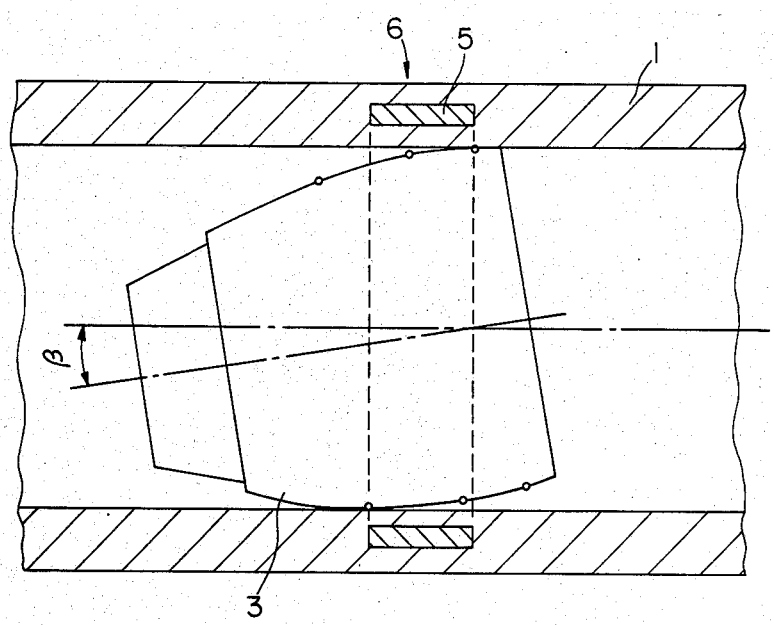

FIG. 5 shows a species of the invention wherein the clamping control members is arranged inside the wall of the cylinder.

Referring now to the drawing wherein like reference numerals are used throughout the various views to designate like parts, a piston 3 of light metal is displaceably supported in a cylinder 1 of an internal combustion engine 2. Control elements generally designated by reference numeral 6 are connected with the cylinder 1 made of light metal. The control elements 6 are provided within the areas A and B of maximum alternating abutment pulses of the piston 3 at the cylinder 1. These areas A and B are located approximately in the upper and lower dead-center position of the piston 3. In particular, the control elements 6 is in each case so arranged at the cylinder that its horizontal center plane X—X coincides with a plane Z—Z that extends through the maximum piston diameter ($D_{max}$) in the upper dead-center position.

The control element 6 consists of a ring-shaped clamping member 5 having a rectangular cross section and has a smaller thermal expansion coefficient than the cylinder 1. The cross-sectional shape, however, can be matched to the requirements of the cast conical inclined removal surfaces of the cylinder or may have a circular shape, a square shape or a shape which approximates a sign$^2$ function.

Figure 1:
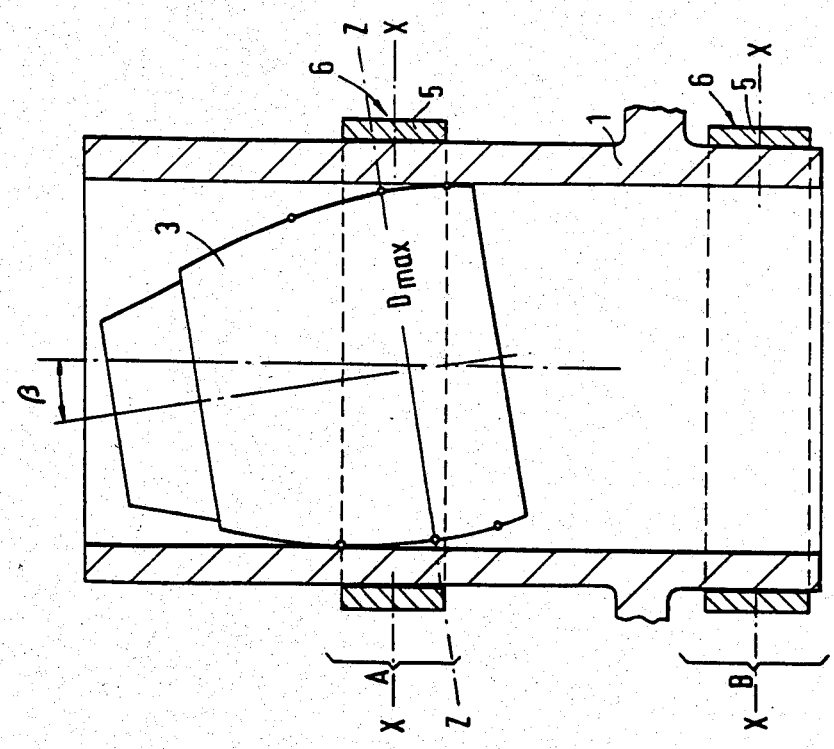
FIG. 1 is a schematic greatly enlarged view through the cylinder of an internal combustion engine with clamping members in accordance with the present invention in the abutment change area with tilted piston and with a cold cylinder liner.

The clamping member 5 is—as shown in detail in FIG. 1—shrunk onto the cylinder 1 or according to another embodiment, the clamping member 5 may also be arranged inside of the wall of the cylinder 1, such as shown in FIG. 5.

The clamping member 5 preferably consists of steel but may also be made of a ceramic material. According to FIG. 3, the clamping member 5 is provided with oppositely disposed areal constrictions 8 having a width b. These contrictions are preferably provided in the oscillating plane of the connecting rod 7 and effect a stronger prevention of the expansion in this plane than in a further plane extending transversely to the oscillating plane.

Figure 2:
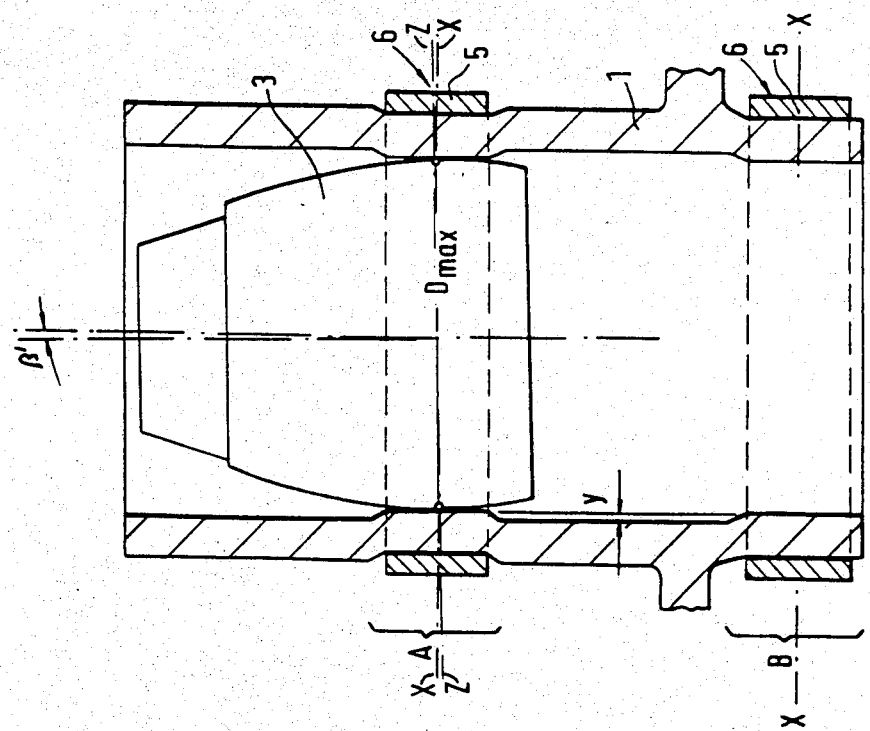
FIG. 2 is a schematic greatly enlarged view through the cylinder of an internal combustion engine with clamping members in accordance with the present invention within the abutment change area with a tilted piston and with a warm cylinder liner.

As illustrated in detail in the greatly enlarged view of FIG. 1, the piston 3 has a ball-shaped form which, without countermeasures, leads within the area of the upper dead-center to a tilting of the piston by the angle $\beta$ within the existing running clearance. As a result of the clamping members 5 at the cylinder 1, the expansion of the cylinder liner 1 is prevented in the critical areas A and B with an increasing engine temperature so that a local constriction results thereat. It leads to the fact that the running clearance of the piston 3 is reduced and the piston can carry out only a tilting movement through the angle $\beta$, as shown in FIG. 2.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arrangement for limiting radial thermal expansions of cylinders of a reciprocating piston internal combustion engine, comprising control means including at least one ring-shaped clamping member which is provided within an area of maximum alternating abutment pulses of a piston in the cylinder, each clamping member consisting of a material having a smaller coefficient of thermal expansion than the cylinder, and wherein the clamping member has such a position at the cylinder that its median center plane coincides approximately to at least one of an upper and lower dead-center position of the piston with a plane normal to piston movement, wherein the normal plane extends through a central region of a maximum piston diameter at said position of the piston.

2. An arrangement according to claim 1, wherein the clamping member for achieving a differing expansion prevention of the cylinder has a smaller width within an area of the oscillating plane of a connecting rod than within a plane extending transversely thereto.

3. An arrangement according to claim 1, wherein the clamping member is arranged inside the wall of the cylinder.

4. An arrangement according to claim 1, wherein the clamping member surrounds the cylinder on the outside thereof.

5. An arrangement according to claim 1, wherein the clamping member consists of ceramic material.

6. An arrangement according to claim 1, wherein the clamping member surrounds the cylinder with a predetermined prestress corresponding to expansion conditions of the cylinder.

7. An arrangement according to claim 1, wherein the clamping member is constructed substantially rectangularly shaped in cross section and is rigidly connected with the cylinder while absorbing expansion forces.

8. An arrangement according to claim 7, wherein the clamping member for achieving a differing expansion prevention of the cylinder has a smaller width within an area of the oscillating plane of the connecting rod than within a plane extending transversely thereto.

9. An arrangement according to claim 8, wherein the clamping member is arranged inside the wall of the cylinder.

10. An arrangement according to claim 8, wherein the clamping member surrounds the cylinder on the outside thereof.

11. An arrangement according to claim 8, wherein the clamping member consists of ceramic material.

12. An arrangement according to claim 8, wherein the clamping member surrounds the cylinder with a predetermined prestress corresponding to expansion conditions of the cylinder.

13. An arrangement according to claim 12, wherein the clamping member consists of ceramic material.

14. An arrangement according to claim 12, wherein the clamping member surrounds the cylinder on the outside thereof.

15. An arrangement accordiong to claim 12, wherein the clamping member is arranged inside the wall of the cylinder.

16. An arrangement for reducing piston noise formation by limiting radial thermal expansions of localized areas of cylinders of a reciprocating piston internal combustion engine while permitting thermal expansion and reduced friction at other areas of the cylinders, comprising control means including at least one ring-shaped clamping member which is located solely within a localized area of large alternating abutment pulses of a piston in the cylinder, each clamping member consisting of a material having a smaller coefficient of thermal expansion than the cylinder and wherein the clamping member has such a position at the cylinder that its median center plane coincides approximately to at least one of an upper and lower dead-center position of the piston with a plane normal to piston movement, wherein the normal plane extends through a central region of a maximum piston diameter when the piston is at a dead center position.

17. An arrangement according to claim 16, wherein a second ring-shaped clamping member is located at a second area of large alternating abutment pulses of the cylinder.

18. An arrangement according to claim 16, wherein the clamping member median center plane coincides with the upper dead-center position of the piston, and wherein a second ring-shaped clamping member is positioned at the cylinder such that is median center plane coincides approximately with the lower dead-center position of the piston with a plane normal to piston movement, wherein the last mentioned normal plane extends through a central region of a maximum piston diameter when the piston is at a lower dead-center position.

19. An arrangement according to claim 17, wherein both ring-shaped clamping members are constructed substantially rectangularly shaped in cross section and rigidly connected with the cylinder while absorbing expansion forces.

20. An arrangement according to claim 18, wherein both ring-shaped clamping members are constructed substantially rectangularly shaped in cross section and rigidly connected with the cylinder while absorbing expansion forces.

21. An arrangement according to claim 16, wherein the clamping member is constructed substantially rectangularly shaped in cross section and is rigidly connected with the cylinder while absorbing expansion forces.

22. An arrangement according to claim 21, wherein the clamping member for achieving a differing expansion prevention of the cylinder has a smaller width within an area of the oscillating plane of a connecting rod than within a plane extending transversely thereto.

23. An arrangement according to claim 22, wherein the clamping member is arranged inside the wall of the cylinder.

24. An arrangement according to claim 22, wherein the clamping member surrounds the cylinder on the outside thereof.

25. An arrangement according to claim 22, wherein the clamping member consists of ceramic material.

26. An arrangement according to claim 22, wherein the clamping member surrounds the cylinder with a predetermined prestress corresponding to the expansion conditions of the cylinder.

27. An arrangement according to claim 26, wherein the clamping member consists of ceramic material.

28. An arrangement according to claim 27, wherein the clamping member surrounds the cylinder on the outside thereof.

29. An arrangement according to claim 27, wherein the clamping member is arranged inside the wall of the cylinder.

* * * * *